(12) United States Patent
Kwon et al.

(10) Patent No.: US 9,981,528 B2
(45) Date of Patent: May 29, 2018

(54) AIR CONDITION AND LAMP CONTROL SYSTEM AND METHOD BASED ON LIGHT SENSING OF VEHICLE

(71) Applicant: Hyundai Motor Company, Seoul (KR)

(72) Inventors: Dong Ho Kwon, Anyang-si (KR); June Kyu Park, Hwaseong-si (KR); Yong Soo Chang, Seoul (KR); Kwang Woon Cho, Yongin-si (KR)

(73) Assignee: Hyundai Motor Company, Seoul (KR)

(*) Notice: Subject to any disclaimer, the term of this patent is extended or adjusted under 35 U.S.C. 154(b) by 484 days.

(21) Appl. No.: 14/824,822

(22) Filed: Aug. 12, 2015

(65) Prior Publication Data

US 2016/0288610 A1    Oct. 6, 2016

(30) Foreign Application Priority Data

Mar. 30, 2015   (KR) .................. 10-2015-0044370

(51) Int. Cl.
*B60H 1/00*    (2006.01)
*B60K 37/02*    (2006.01)
*B60Q 1/14*    (2006.01)

(52) U.S. Cl.
CPC ........... *B60H 1/0075* (2013.01); *B60K 37/02* (2013.01); *B60Q 1/1423* (2013.01)

(58) Field of Classification Search
CPC ..... B60H 1/0075; B60K 37/02; B60Q 1/1423
See application file for complete search history.

(56) References Cited

U.S. PATENT DOCUMENTS

| | | | | |
|---|---|---|---|---|
| 4,441,405 A | * | 4/1984 | Takeuchi ............ | B60H 1/0075 236/94 |
| 4,760,772 A | * | 8/1988 | Horiguchi ........... | B60H 1/0075 165/203 |
| 2005/0045802 A1 | * | 3/2005 | Niemann ............ | B60H 1/0075 250/203.1 |
| 2011/0271697 A1 | * | 11/2011 | Sunaga ............... | B60H 1/0075 62/126 |

FOREIGN PATENT DOCUMENTS

| KR | 20-1999-0027918 U | 7/1999 |
|---|---|---|
| KR | 10-2003-0017864 A | 3/2003 |
| KR | 10-2007-0005034 A | 1/2007 |
| KR | 10-2010-0058365 A | 6/2010 |
| KR | 10-2015-0000111 A | 1/2015 |

\* cited by examiner

*Primary Examiner* — Mary Ellen Bowman
(74) *Attorney, Agent, or Firm* — Morgan, Lewis & Bockius LLP

(57) ABSTRACT

An air condition and lamp control system based on a light sensing of a vehicle may include an illumination sensor configured to detect an amount of irradiation of light irradiated into an interior side of the vehicle to be distinguished in a left and a right, an air condition controller configured to receive a left input voltage and a right input voltage according to the amount of irradiation of light detected by the illumination sensor and to independently compensate for left and right interior temperatures, a voltage amplifier configured to sum the left input voltage and the right input voltage which are transferred from the illumination sensor and to amplify the summed voltage to an amplified voltage, and a lamp controller configured to receive the amplified voltage amplified by the voltage amplifier, to compare the amplified voltage and a prestored lamp operation voltage, and to drive a lamp apparatus.

14 Claims, 4 Drawing Sheets

AIR CONDITION AND LAMP CONTROL SYSTEM AND METHOD BASED ON LIGHT SENSING OF VEHICLE

CROSS REFERENCE TO RELATED APPLICATION

The present application claims priority to Korean Patent Application Number 10-2015-0044370 filed Mar. 30, 2015, the entire contents of which is incorporated herein for all purposes by this reference.

BACKGROUND OF THE INVENTION

Field of the Invention

The present invention relates to an air condition and lamp control system based on a light sensing of a vehicle controlling a cooling and heating air condition and an auto light of a lamp according to an irradiation amount of solar light using one light sensor.

Description of Related Art

A vehicle is provided with an air condition system providing a pleasant environment to passengers by adjusting temperature of interior air of the vehicle depending on an outside temperature condition and allowing a driver to safely drive the vehicle by securing a clear view of the driver when a frost of a window is generated.

In recent, the air condition system creates more pleasant environment for the passengers by adjusting interior temperature of the vehicle, according to an amount of solar radiation as well as the outside temperature and frost generation condition. That is, the vehicle includes a solar light sensor sensing the amount of solar radiation and the interior temperature is compensated by adjusting a discharging airflow and discharging temperature of an air conditioner in a direction in which light is irradiated so that the interior temperature of a specific seat is not changed depending on the direction in which the solar light is irradiated.

Meanwhile, the vehicle includes an auto light system that automatically turns on or off the lamp by recognizing surrounding brightness. The auto light system controls an operation of a head lamp according to an output value of an auto light sensor detecting brightness around the vehicle.

As such, the air condition system and the auto light system are controlled according to the amount of irradiation of light. To this end, the air condition system and the auto light system should include a solar light sensor for the air condition system and an auto light sensor for an auto light, respectively. Particularly, in the case of the air condition system, when a large amount of radiation of light so as to influence an interior temperature change is incident, an air conditioner is driven, and in the case of the auto light system, when the amount of irradiation so as to distinguish day and night is incident, the auto light is driven.

As such, according to the related art, since the solar light sensor for the air condition system and the auto light sensor for the auto light system should be each provided, costs are increased due to an addition of the sensor and a separate control condition according to each system is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air condition and lamp control system based on a light sensing of a vehicle controlling a cooling and heating air condition and an auto light of a lamp according to an irradiation amount of solar light using one light sensor.

According to various aspects of the present invention, an air condition and lamp control system based on a light sensing of a vehicle may include an illumination sensor configured to detect an amount of irradiation of light irradiated into an interior side of the vehicle to be distinguished in a left and a right, an air condition controller configured to receive a left input voltage and a right input voltage according to the amount of irradiation of light detected by the illumination sensor and to independently compensate for left and right interior temperatures by adjusting an air conditioner according to the left input voltage and the right input voltage, a voltage amplifier configured to sum the left input voltage and the right input voltage which are transferred from the illumination sensor and to amplify the summed voltage to an amplified voltage, and a lamp controller configured to receive the amplified voltage amplified by the voltage amplifier, to compare the amplified voltage and a prestored lamp operation voltage, and to drive a lamp apparatus in a case in which the amplified voltage does not reach the lamp operation voltage.

The illumination sensor may include a left sensing device and a right sensing device so as to detect the light irradiated into a driver's seat side and a passenger's seat side of the vehicle to be distinguished in the left and the right.

The illumination sensor may include a light blind wall provided between the left sensing device and the right sensing device, such that light irradiated into the left sensing device and the right sensing device is incident to be distinguished in the left and the right.

The illumination sensor may be configured to transfer the left input voltage and the right input voltage detected by the left sensing device and the right sensing device to the air condition controller, and the air condition controller may be configured to compensate for the interior temperature by adjusting an operation of the air conditioner at set temperature according to the corresponding input voltage based on the left input voltage and the right input voltage which are received.

The voltage amplifier may be provided between the illumination sensor and the lamp controller and may include an amplification circuit for amplifying the input voltage detected by the illumination sensor.

The left input voltage and the right input voltage detected by the illumination sensor may be summed by passing through diodes provided to the left and the right, respectively, and may then be transferred to the voltage amplifier.

The diodes may be configured so that the input voltage detected by the illumination sensor is transferred only in a direction of the voltage amplifier.

The lamp controller may be configured to prevent the lamp apparatus from being driven when the amplified voltage is the lamp operation voltage or more, and to allow the lamp apparatus to be driven when the amplified voltage is less than the lamp operation voltage.

The air condition and lamp control system may further include a first light sensing element having a first input terminal of the air condition controller connected to a first end thereof, having a first resistor connected to a second end of the first light sensing element, and configured to output a current according to the amount of irradiation of light, a first diode connected to a first end of the first resistor and configured to allow a voltage transferred from the first light sensing element to be output in one direction, a second light sensing element having a second input terminal of the air condition controller connected to a first end thereof, having a second resistor connected to a second end of the second light sensing element, and configured to output the current according to the amount of irradiation of light, a second diode connected to a first end of the second resistor and configured to allow a voltage transferred from the second light sensing element to be output in one direction, and an amplifier having a first end connected to a contact point between the first diode and the second diode and a second end connected to an input terminal of the lamp controller.

The first end of the amplifier may be an input terminal including a non-inverting terminal and an inverting terminal, the second end of the amplifier may be an output terminal, the non-inverting terminal of the input terminal may be connected to a contact point between the first light sensing element and the second light sensing element and the inverting terminal of the input terminal may be connected to a first end of a third resistor having a second end connected to a ground terminal and a first end of a fourth resistor, and the output terminal may be connected to a second end of the fourth resistor and the input terminal of the lamp controller.

According to various aspects of the present invention, an air condition and lamp control method based on a light sensing of a vehicle may include a detection operation, by an illumination sensor, of detecting an amount of irradiation of light irradiated into an interior side of the vehicle to be distinguished in a left and a right, an air condition compensation operation, by an air condition controller, of checking a left input voltage and a right input voltage according to the detected amount of irradiation of light and independently compensating for left and right interior temperatures by adjusting an air conditioner according to the left input voltage and the right input voltage, a voltage amplification operation, by a voltage amplifier, of summing the left input voltage and the right input voltage and amplifying the summed voltage to an amplified voltage, and a lamp driving operation, by a lamp controller, of comparing the amplified voltage and a prestored lamp operation voltage and driving a lamp apparatus in a case in which the amplified voltage does not reach the lamp operation voltage.

In the detection operation, light irradiated into a driver's seat and a passenger's seat of the vehicle may be detected to be distinguished in the left and the right.

In the air condition compensation operation, the interior temperatures may be compensated by adjusting an operation of the air conditioner at set temperature according to the corresponding input voltage based on the left input voltage and the right input voltage which are received.

In the lamp driving operation, in a case in which the amplified voltage is the lamp operation voltage or more, the lamp apparatus may not be driven, and in a case in which the amplified voltage is less than the lamp operation voltage, the lamp apparatus may be driven.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
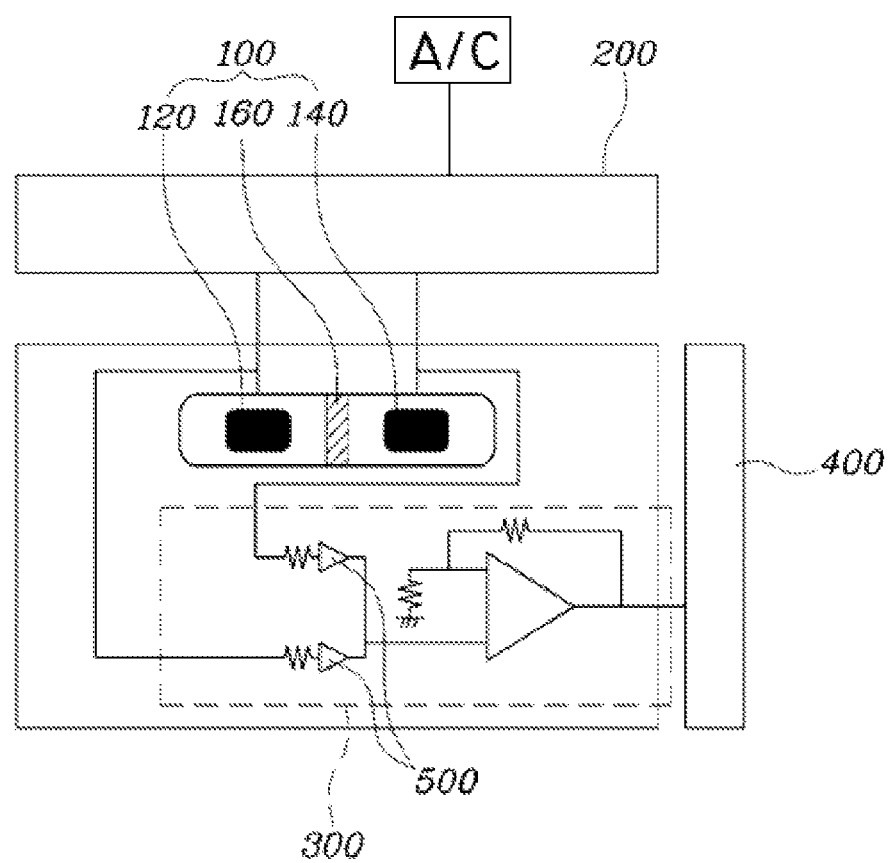
FIG. 1 is a configuration diagram of an exemplary air condition and lamp control system based on a light sensing of a vehicle according to the present invention.
Figure 2:
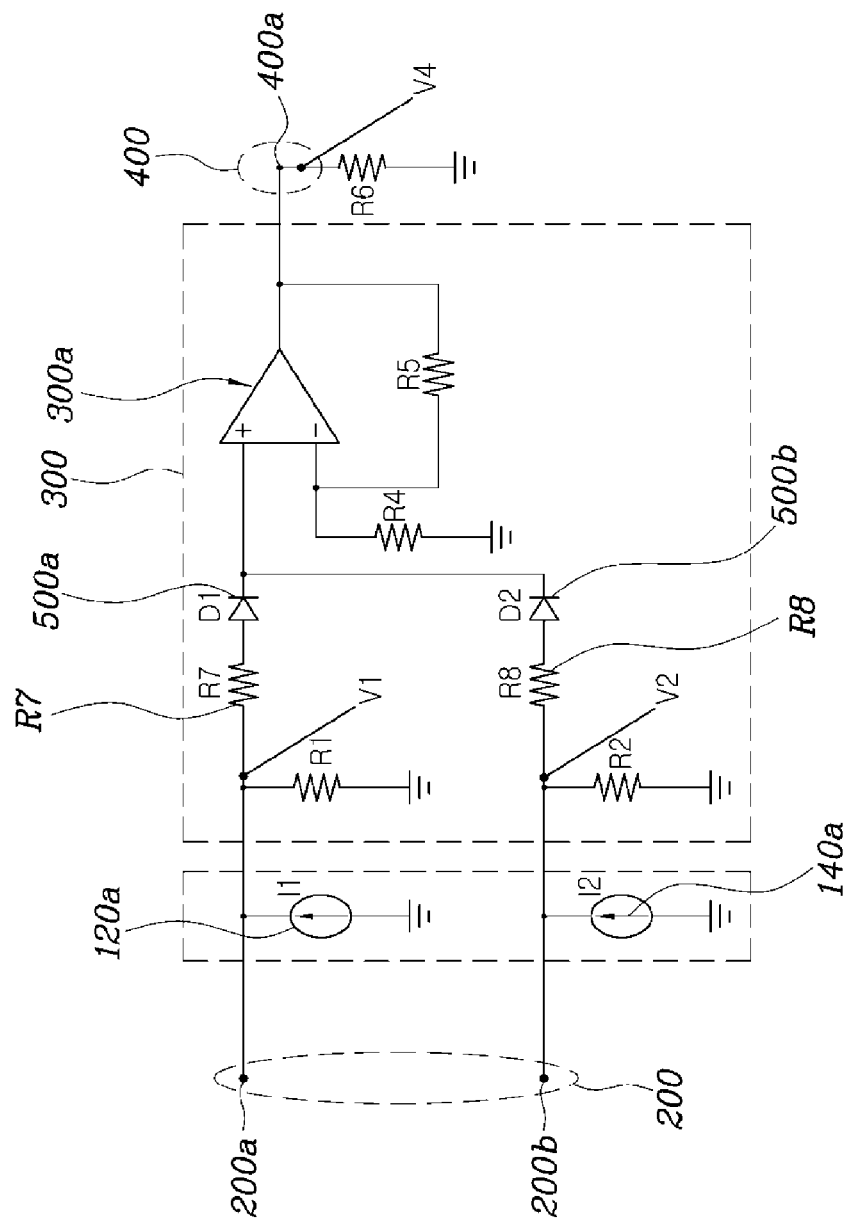
FIG. 2 is a circuit diagram of the exemplary air condition and lamp control system based on the light sensing of the vehicle shown in FIG. 1.
Figure 3:
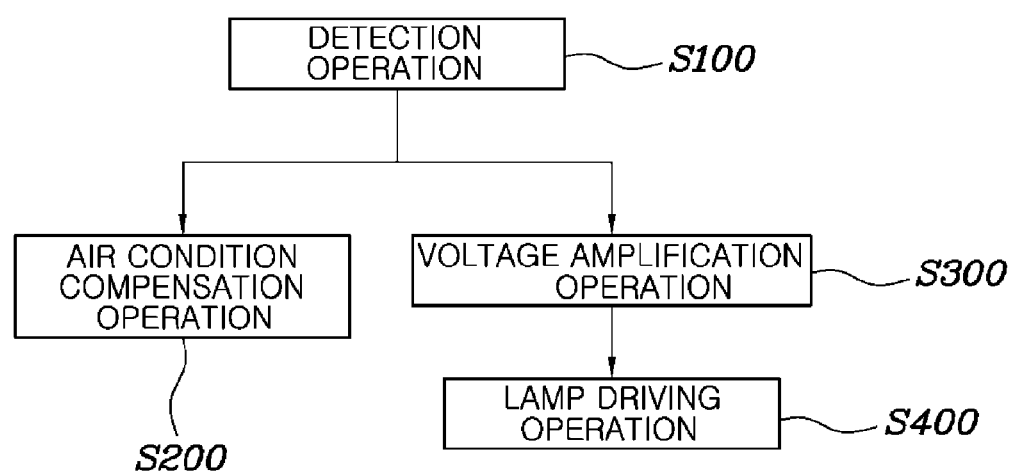
FIG. 3 and FIG. 4 are flow charts of the exemplary air condition and lamp control system based on the light sensing of the vehicle shown in FIG. 1.
Figure 4:
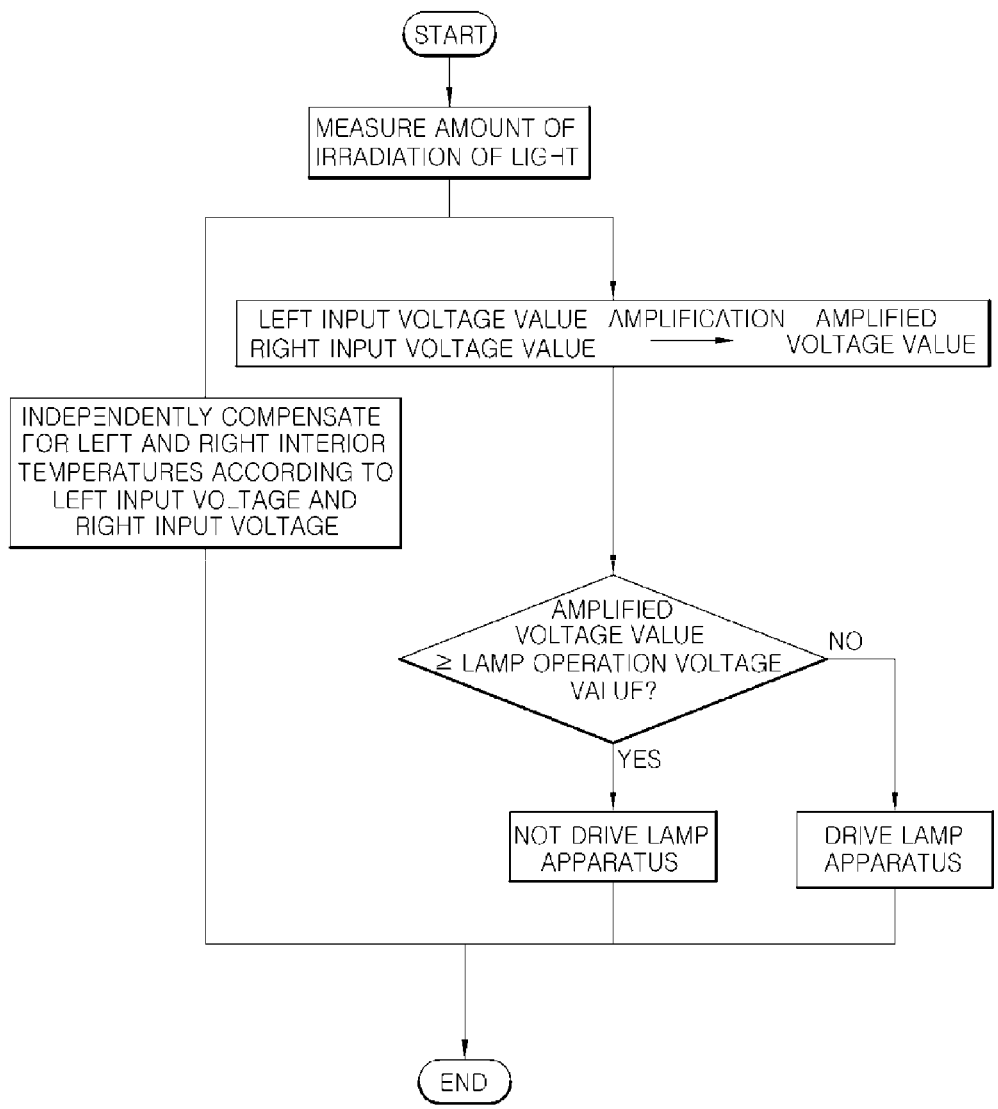

FIG. 1 is a configuration diagram of an air condition and lamp control system based on a light sensing of a vehicle according to the present invention, FIG. 2 is a circuit diagram of the air condition and lamp control system based on a light sensing of a vehicle shown in FIG. 1, and FIG. 3 and FIG. 4 are flow charts of the air condition and lamp control system based on a light sensing of a vehicle shown in FIG. 1.

An air condition and lamp control system based on a light sensing of a vehicle according to the present invention includes an illumination sensor 100 detecting an amount of irradiation of light irradiated into an interior side of the vehicle to be distinguished in a left and a right, an air condition controller 200 receiving a left input voltage and a right input voltage according to the amount of irradiation of light detected by the illumination sensor 100 and independently compensating for left and right interior temperatures by adjusting an air conditioner A/C according to the left input voltage and the right input voltage which are received, a voltage amplifier 300 summing the left input voltage and the right input voltage which are transferred from the illumination sensor 100 and amplifying the summed voltage to an amplified voltage, and a lamp controller 400 receiving the amplified voltage amplified by the voltage amplifier 300, comparing the amplified voltage and a prestored lamp operation voltage, and driving a lamp apparatus in a case in which the amplified voltage does not reach the lamp operation voltage, as shown in FIG. 1.

The present invention is to detect the amount of irradiation of light by only one illumination sensor 100 and to perform a control of the air conditioner A/C and a control of an auto light according to the amount of irradiation of light. Therefore, the air condition controller 200 adjusting the air conditioner A/C by receiving the input voltage according to the amount of irradiation of light detected by the illumination sensor 100 and the lamp controller 400 driving the lamp apparatus are provided.

However, there is a difference in that a condition in which the operation of the air conditioner A/C is adjusted is that a large amount of irradiation of light so as to make passengers unpleasant needs to be incident as light is irradiated and a condition in which the lamp apparatus is driven is that an amount of irradiation of light so as to distinguish night and day is incident. Therefore, according to the present invention, the voltage amplifier 300 is provided, so that the input voltage according to the amount of irradiation of light detected by one illumination sensor 100 is each transferred to the air condition controller 200 and the lamp controller 400 as different voltages to allow the air conditioner A/C and the lamp apparatus to be operated at a suitable timing according to the amount of irradiation of light.

That is, the air condition controller 200 receives the left input voltage and the right input voltage transferred from the illumination sensor 100 as it is and checks the left input voltage and the right input voltage to determine the adjustment of the air conditioner A/C. The lamp controller 400 receives the left input voltage and the right input voltage transferred from the illumination sensor 100, receives the amplified voltage amplified by the voltage amplifier 300, and compares the amplified voltage with the prestored lamp operation voltage to determine the driving of the lamp apparatus.

Thereby, by controlling the driving of the air conditioner A/C and the lamp apparatus by only one illumination sensor 100, the interior temperature may be compensated according to the amount of irradiation of light and a turn on or off of the lamp may be controlled according the amount of irradiation of light at the same time.

As shown in FIG. 1, the illumination sensor 100 may include two sensing devices to detect light irradiated into a driver's seat side and a passenger's seat side of the vehicle to be distinguished in the left and the right.

The illumination sensor 100 described above may be a single sensor including two photodiodes and consequently, a seat in which light is more strongly irradiated among the driver's seat and the passenger's seat may be determined by detecting a position of the sun. Thereby, by compensating for the interior temperature of the seat in which the light of the sun is more strongly irradiated among the driver's seat and the passenger's seat, an optimal air condition may also be implemented according to the amount of irradiation of light.

The illumination sensor 100 may be configured of a left sensing device 120 and a right sensing device 140, and a light blind wall 160 is provided between the left sensing device 120 and the right sensing device 140 to allow light irradiated into the left sensing device 120 and the right sensing device 140 to be incident to be distinguished in the left and the right. As such, the light irradiated into the driver's seat or the passenger's seat is clearly distinguished according to an irradiation angle of light depending on the position of the sun by providing the blind wall 160 between the left sensing device 120 and the right sensing device 140, such that a smooth and efficient air condition control may be performed according to light irradiated into the driver's seat or the passenger's seat.

Meanwhile, the illumination sensor 100 may transfer the left input voltage and the right input voltage detected by the left sensing device 120 and the right sensing device 140 to the air condition controller 200, and the air condition controller 200 may compensate for the interior temperature by adjusting the operation of the air conditioner A/C at set temperature according to the corresponding input voltage based on the left input voltage and the right input voltage which are received.

Here, the air condition controller 200 compensates for the interior temperature by receiving the left input voltage and the right input voltage detected by the left sensing device 120 and the right sensing device 140 and adjusting the operation of the air conditioner A/C so that air of prestored set temperature according to the corresponding input voltage is independently provided to the driver's seat and the passenger's seat, respectively, based on the left input voltage and the right input voltage which are received. That is, in the condition in which the air conditioner A/C is driven, the driving of the air conditioner A/C is adjusted so that the interior temperature of the driver's seat or the passenger's seat is independently compensated based on the left input voltage and the right input voltage according to the amount of irradiation of light.

Here, the set temperature according to the input voltage, which is a condition in which the operation of the air conditioner A/C is adjusted so that displeasure is solved when a condition in which the passenger feels displeasure is generated according to the amount of irradiation of light, may be set to a suitable value by experimentation.

As such, by adjusting the air conditioner A/C according to the amount of irradiation of light to compensate for the interior temperature, displeasure of the passenger according to the amount of irradiation of light is solved, thereby making it possible to create a pleasant environment.

Meanwhile, as shown in FIG. 2, the voltage amplifier 300 may be connected between the illumination sensor 100 and the lamp controller 400 and include an amplification circuit amplifying the input voltage detected by the illumination sensor 100.

The illumination sensor 100 is classified into the left sensing device 120 and the right sensing device 140 so that light irradiated into the driver's seat and the passenger's seat of the vehicle is detected to be distinguished in the left and the right, but since the lamp controller 400 distinguishes night and day without distinguishing the left and the right, the lamp controller 400 simultaneously receives detection values of the left sensing device 120 and the right sensing device 140.

Particularly, the voltage according to the amount of irradiation of light detected by the illumination sensor 100 is transferred to the air condition controller 200 as it is and the control of the air conditioner A/C is performed according to the amount of irradiation of light, but since the lamp controller 400 has an operation timing of the lamp apparatus according to the amount of irradiation of light different from that of the air conditioner A/C, the lamp controller 400 receives the voltage amplified by the voltage amplifier 300.

By way of example, when various amounts of illumination of the amount of irradiation of light from 0 to 100,000 lux are incident, the illumination sensor 100 detects the amount of irradiation of light to be distinguished in the left and the right and transfers the input voltage in the left and the right, respectively, to the air condition controller 200, and the air condition controller 200 adjusts the air conditioner A/C so that air having the set temperature according to the corresponding input voltage is independently provided to the left and the right, respectively, based on the left input voltage and the right input voltage transferred from the illumination sensor 100.

At the same time, the lamp controller 400 receives the left input voltage and the right input voltage detected by the illumination sensor 100 and receives the amplified voltage amplified by the voltage amplifier 300. As such, as the voltage amplifier 300 amplifies the input voltage transferred from the illumination sensor 100 to the amplified voltage, a voltage satisfying a condition in which the lamp apparatus is turned on or off when a specific amount of illumination is incident is transferred to the lamp controller 400, and in this case, the lamp controller 400 may determine the driving of the lamp apparatus.

Particularly, the left input voltage and the right input voltage detected by the illumination sensor 100 may be summed by passing through diodes 500 provided to the left and the right, respectively, and may be then transferred to the voltage amplifier 300. The above-mentioned diodes 500 may be configured so that the input voltage detected by the illumination sensor 100 flows only in a direction of the voltage amplifier 300.

That is, the illumination sensor 100 according to the present invention is configured to detect the amount of irradiation of light to be distinguished in the left and the right and detects the left input voltage and the right input voltage, and the left input voltage and the right input voltage are transferred to the air condition controller 200 and the lamp controller 400. However, the left input voltage and the right input voltage transferred to the air condition controller 200 are transferred to be each distinguished, but the left input voltage and the right input voltage transferred to the lamp controller 400 are summed to pass through the voltage amplifier, and are then transferred to the lamp controller 400.

Here, the left input voltage and the right input voltage transferred to the lamp controller 400 are exchanged while having a contact point, and in this case, the left input voltage and the right input voltage may be transferred to the air condition controller 200 to be mixed. In this case, since error of the operation timing of the air conditioner A/C may occur, the present invention limits the transfer of the voltage to the air condition controller 200 after the left input voltage and the right input voltage are exchanged, by providing the diodes 500 in a direction in which the left input voltage and the right input voltage are transferred to the lamp controller 400.

Thereby, since the left input voltage and the right input voltage detected by the illumination sensor 100 are transferred to the air condition controller 200 to be distinguished, an accurate air condition balance may be implemented, and since the left input voltage and the right input voltage are summed and are transferred to the lamp controller 400, the lamp apparatus may also be driven at a suitable timing.

Meanwhile, the lamp controller 400 receiving the voltage of the illumination sensor 100 through the voltage amplifier 300 determines the driving of the lamp apparatus by comparing the amplified voltage with a prestored lamp operation voltage.

Specifically, the illumination sensor 100 according to the present invention detects the amount of irradiation of light to be distinguished in the left and the right, and the lamp controller 400, which is to drive the lamp apparatus by distinguishing night and day, receives the left input voltage and the right input voltage, receives the amplified voltage to which the left input voltage and the right input voltage are summed and are amplified by the voltage amplifier 300, and determines the driving of the lamp apparatus by comparing the amplified voltage with the lamp operation voltage.

Here, when the amplified voltage is the lamp operation voltage or more, since it means that the amount of illumination of light is sufficient and the surrounding is bright, the lamp controller 400 may not allow the lamp apparatus to be driven, and when the amplified voltage is less than the lamp operation voltage, since it means that the surrounding is dark, the lamp controller 400 may allow the lamp apparatus to be driven.

As such, the lamp controller 400 simultaneously receives the left and right input voltages transferred from the illumination sensor 100 to the air condition controller 200, and particularly, as the left and right input voltages are amplified to the amplified voltage by the voltage amplifier 300, the driving timing of the lamp apparatus may be determined.

The air condition and lamp control system based on the light sensing of the vehicle according to the present invention described above may be configured as the circuit diagram shown in FIG. 2.

As shown in FIG. 2, the air condition and lamp control system according to the present invention includes a first light sensing element 120a having a first input terminal 200a of the air condition controller connected to one end thereof, having a first resistor R7 connected to the other end thereof, and outputting a current according to an amount of irradiation of light, a first diode 500a connected to the other end of the first resistor R7 and allowing a voltage transferred from the first light sensing element 120a to be output in one direction, a second light sensing element 140a having a second input terminal 200b of the air condition controller connected to one end thereof, having a second resistor R8 connected to the other end thereof, and outputting the current according to the amount of irradiation of light, a second diode 500b connected to the other end of the second resistor R8 and allowing a voltage transferred from the second light sensing element 140a to be output in one direction, and an amplifier 300a having one end connected to a contact point between the first diode 500a and the second diode 500b and the other end connected to an input terminal 400a of the lamp controller.

That is, the voltages according to the amount of irradiation of light detected by the first light sensing element 120a and the second light sensing element 140a are each transferred to the first input terminal 200a and the second input terminal 200b of the air condition controller to be distinguished.

At the same time, the respective voltages according to the amount of irradiation of light detected by the first light sensing element 120a and the second light sensing element 140a are summed by passing through the first diode 500a and the second diode 500b and are then transferred to the amplifier 300a.

Here, the first diode 500a and the second diode 500b are configured to allow the voltages detected by the first light sensing element 120a and the second light sensing element 140a to flow in a direction of the amplifier 300a, but block the flow of the voltages in an opposite direction. As such, a flow of the current detected by the first light sensing element 120a to the second light sensing element 140a, or a flow of the current detected by the second light sensing element 140a to the first light sensing element 120a is limited by limiting the flow of the voltages detected by the first light sensing element 120a and the second light sensing element 140a by providing the first diode 500a and the second diode 500b, thereby making it possible to prevent error in which the voltage transferred to the air condition controller is changed.

Meanwhile, one end of the amplifier 300a may be an input terminal including a non-inverting terminal and an inverting terminal, the other end of the amplifier 300a may be an output terminal, the non-inverting terminal of the input terminal may be connected to a contact point between the first light sensing element 120a and the second light sensing element 140a, the inverting terminal of the input terminal may be connected to the other end of a third resistor R4 having one end connected to a ground terminal and one end of a fourth resistor R5, and the output terminal may be connected to the other end of the fourth resistor R5 and the input terminal 400a of the lamp controller.

As described above, when applying the circuit diagram according to various embodiments shown in FIG. 2, the input voltage transferred to the input terminal of the lamp controller may be amplified to the amplified voltage by the following Equation.

$$V_4 = \left[\left(\frac{R_8}{R_7+R_8}\right)*V_1 + \left(\frac{R_7}{R_7+R_8}\right)*V_2\right]*\left(1+\frac{R_5}{R_4}\right),$$ [Equation 1]

where $V_1$ is a voltage value input to a first input terminal of the air condition controller, $V_2$ is a voltage value input to a second input terminal of the air condition controller, and $V_4$ is a voltage value input to the input terminal of the lamp controller.

Here, the respective resistance values may be set to suitable values according to the input voltage according to the temperature adjustment of the air condition controller 200 and the lamp operation voltage which is prestored in the lamp controller 400.

Meanwhile, an air condition and lamp control method based on a light sensing of a vehicle according to the present invention includes a detection operation (S100) of detecting an amount of irradiation of light irradiated into an interior side of the vehicle to be distinguished in a left and a right, an air condition compensation operation (S200) of checking a left input voltage and a right input voltage according to the detected amount of irradiation of light and independently compensating for left and right interior temperatures according to the left input voltage and the right input voltage, a voltage amplification operation (S300) of summing the left input voltage and the right input voltage and amplifying the summed voltage to an amplified voltage, and a lamp driving operation (S400) of comparing the amplified voltage and a prestored lamp operation voltage and driving a lamp apparatus in a case in which the amplified voltage does not reach the lamp operation voltage, as shown in FIG. 3 and FIG. 4.

Here, in the detection operation (S100), light irradiated into a driver's seat and a passenger's seat of the vehicle may be detected to be distinguished in the left and the right. In order to distinguish the light in the left and the right, a single sensor including two photodiodes may be applied, and consequently, a seat in which light is more strongly irradiated among the driver's seat and the passenger's seat depending on the position of the sun may be determined to compensate for interior temperature.

Meanwhile, in the air condition compensation operation (S200), the interior temperatures of the driver's seat side and the passenger's seat side may be each independently compensated by adjusting an operation of the air conditioner A/C at set temperature according to the corresponding input voltage based on the left input voltage and the right input voltage which are received.

The interior temperatures may be pleasantly maintained by independently performing an air condition for a seat in which the light is more strongly irradiated, according to the amount of irradiation of light irradiated into the driver's seat and the passenger's seat.

Meanwhile, in the lamp driving operation (S400), the amplified voltage obtained by amplifying the left input voltage and the right input voltage detected from the driver's seat side and the passenger's seat side is compared with the prestored lamp operation voltage, in the case in which the amplified voltage is the lamp operation voltage or more, the lamp apparatus may not be driven, and in a case in which the amplified voltage is less than the lamp operation voltage, the lamp apparatus may be driven.

However, since an operation timing according to the amount of irradiation of light of the lamp apparatus upon determining the driving of the lamp apparatus and an operation timing of the air conditioner A/C are different, after the left input voltage and the right input voltage detected in the detection operation (S100) are amplified to the amplified voltage through the voltage amplification operation (S300), the driving of the lamp apparatus is determined by the amplified voltage.

Thereby, the air condition may be independently performed for the driver's seat or the passenger's seat only by one sensor detecting the amount of irradiation of light and an auto light function may also be performed.

According to the air condition and lamp control system based on the light sensing of the vehicle having the configuration described above, by using only the light sensor for the air conditioner A/C, the interior temperatures of the driver's seat and the passenger's seat may be each independently compensated according to the amount of irradiation of light and the turn on or off of the lamp may be controlled according to the amount of irradiation of light.

As such, by controlling the air condition system and the auto light system using only one sensor, costs may be reduced according to a decrease in the number of sensors.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air condition and lamp control system based on a light sensing of a vehicle, the air condition and lamp control system comprising:
   an illumination sensor configured to detect an amount of irradiation of light irradiated into an interior side of the vehicle to be distinguished in a left and a right;
   an air condition controller configured to receive a left input voltage and a right input voltage according to the amount of irradiation of light detected by the illumination sensor and to independently compensate for left and right interior temperatures by adjusting an air conditioner according to the left input voltage and the right input voltage;

a voltage amplifier configured to sum the left input voltage and the right input voltage which are transferred from the illumination sensor and to amplify the summed voltage to an amplified voltage; and a lamp controller configured to receive the amplified voltage amplified by the voltage amplifier, to compare the amplified voltage and a prestored lamp operation voltage, and to drive a lamp apparatus in a case in which the amplified voltage does not reach the lamp operation voltage.

2. The air condition and lamp control system of claim 1, wherein the illumination sensor includes a left sensing device and a right sensing device so as to detect the light irradiated into a driver's seat side and a passenger's seat side of the vehicle to be distinguished in the left and the right.

3. The air condition and lamp control system of claim 2, wherein the illumination sensor includes a light blind wall provided between the left sensing device and the right sensing device, such that light irradiated into the left sensing device and the right sensing device is incident to be distinguished in the left and the right.

4. The air condition and lamp control system of claim 2, wherein the illumination sensor is configured to transfer the left input voltage and the right input voltage detected by the left sensing device and the right sensing device to the air condition controller, and the air condition controller is configured to compensate for the interior temperature by adjusting an operation of the air conditioner at set temperature according to the corresponding input voltage based on the left input voltage and the right input voltage which are received.

5. The air condition and lamp control system of claim 1, wherein the voltage amplifier is provided between the illumination sensor and the lamp controller and includes an amplification circuit for amplifying the input voltage detected by the illumination sensor.

6. The air condition and lamp control system of claim 5, wherein the left input voltage and the right input voltage detected by the illumination sensor are summed by passing through diodes provided to the left and the right, respectively, and are then transferred to the voltage amplifier.

7. The air condition and lamp control system of claim 6, wherein the diodes are configured so that the input voltage detected by the illumination sensor is transferred only in a direction of the voltage amplifier.

8. The air condition and lamp control system of claim 1, wherein the lamp controller is configured to prevent the lamp apparatus from being driven when the amplified voltage is the lamp operation voltage or more, and to allow the lamp apparatus to be driven when the amplified voltage is less than the lamp operation voltage.

9. The air condition and lamp control system of claim 1, further comprising:

a first light sensing element having a first input terminal of the air condition controller connected to a first end thereof, having a first resistor connected to a second end of the first light sensing element, and configured to output a current according to the amount of irradiation of light;

a first diode connected to a first end of the first resistor and configured to allow a voltage transferred from the first light sensing element to be output in one direction;

a second light sensing element having a second input terminal of the air condition controller connected to a first end thereof, having a second resistor connected to a second end of the second light sensing element, and configured to output the current according to the amount of irradiation of light;

a second diode connected to a first end of the second resistor and configured to allow a voltage transferred from the second light sensing element to be output in one direction; and an amplifier having a first end connected to a contact point between the first diode and the second diode and a second end connected to an input terminal of the lamp controller.

10. The air condition and lamp control system of claim 9, wherein the first end of the amplifier is an input terminal including a non-inverting terminal and an inverting terminal, the second end of the amplifier is an output terminal, the non-inverting terminal of the input terminal is connected to a contact point between the first light sensing element and the second light sensing element and the inverting terminal of the input terminal is connected to a first end of a third resistor having a second end connected to a ground terminal and a first end of a fourth resistor, and the output terminal is connected to a second end of the fourth resistor and the input terminal of the lamp controller.

11. An air condition and lamp control method based on a light sensing of a vehicle, the air condition and lamp control method comprising:

a detection operation, by an illumination sensor, of detecting an amount of irradiation of light irradiated into an interior side of the vehicle to be distinguished in a left and a right;

an air condition compensation operation, by an air condition controller, of checking a left input voltage and a right input voltage according to the detected amount of irradiation of light and independently compensating for left and right interior temperatures by adjusting an air conditioner according to the left input voltage and the right input voltage;

a voltage amplification operation, by a voltage amplifier, of summing the left input voltage and the right input voltage and amplifying the summed voltage to an amplified voltage; and a lamp driving operation, by a lamp controller, of comparing the amplified voltage and a prestored lamp operation voltage and driving a lamp apparatus in a case in which the amplified voltage does not reach the lamp operation voltage.

12. The air condition and lamp control method of claim 11, wherein in the detection operation, light irradiated into a driver's seat and a passenger's seat of the vehicle is detected to be distinguished in the left and the right.

13. The air condition and lamp control method of claim 11, wherein in the air condition compensation operation, the interior temperatures are compensated by adjusting an operation of the air conditioner at set temperature according to the corresponding input voltage based on the left input voltage and the right input voltage which are received.

14. The air condition and lamp control method of claim 11, wherein in the lamp driving operation, in a case in which the amplified voltage is the lamp operation voltage or more, the lamp apparatus is not driven, and in a case in which the amplified voltage is less than the lamp operation voltage, the lamp apparatus is driven.

* * * * *